(12) United States Patent
Padmanabhan (10) Patent No.: US 10,513,297 B2
(45) Date of Patent: *Dec. 24, 2019

(54) FLEXIBLE COMPOSITE LAP JOINT FOR TRAILER FLOORING

(71) Applicant: HAVCO WOOD PRODUCTS, LLC., Scott City, MO (US)

(72) Inventor: Gopalkrishna Padmanabhan, Fenton, MO (US)

(73) Assignee: HAVCO WOOD PRODUCTS, LLC, Scott City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,478

(22) Filed: Nov. 20, 2014

(65) Prior Publication Data

US 2015/0076861 A1 Mar. 19, 2015

Related U.S. Application Data

(63) Continuation of application No. 13/012,899, filed on Jan. 25, 2011, now Pat. No. 8,950,144.

(51) Int. Cl.
*B62D 25/20* (2006.01)
*B62D 29/02* (2006.01)
(Continued)

(52) U.S. Cl.
CPC ......... *B62D 29/02* (2013.01); *B62D 25/2054* (2013.01); *E04F 15/041* (2013.01);
(Continued)

(58) Field of Classification Search
CPC ....... E04F 15/04; E04F 15/041; E04F 15/042; E04F 15/043; E04F 2203/06; B32B 21/08;
(Continued)

(56) References Cited

U.S. PATENT DOCUMENTS

| 4,242,390 A | 12/1980 | Nemeth |
| 4,526,418 A * | 7/1985 | Martin ............... B62D 25/2054 |
| | | 105/422 |

(Continued)

OTHER PUBLICATIONS

International Search Report and Written Opinion from PCT/US2011/022319 dated Mar. 23, 2011.
(Continued)

*Primary Examiner* — Ryan D Kwiecinski
(74) *Attorney, Agent, or Firm* — Ohlandt, Greeley, Ruggiero & Perle, LLP (57) ABSTRACT

A composite wood floor board assembled adjacent to another composite wood floor board, each the board comprising: a top layer of laminated hardwood comprising: a top side; a bottom side; a first lateral side; and a second lateral side opposite the first lateral side, wherein at least one of the first and second lateral sides is formed without shiplap lips; and a bottom layer comprising a planar fiber-reinforced polymer composite that is bonded to the bottom side of the top layer of the laminated hardwood and reinforces the top layer, wherein the bottom layer of fiber-reinforced polymer composite extends laterally outwardly by a distance up to two inches (2") from the first lateral side of the top layer, and wherein a part of the bottom layer of the composite wood floor board is bonded to the top layer with a first adhesive and a part of the bottom layer is bonded with a second adhesive or sealant.

9 Claims, 11 Drawing Sheets (51) Int. Cl.
*E04F 15/04* (2006.01)
*B32B 21/08* (2006.01)

(52) U.S. Cl.
CPC ........ *E04F 15/043* (2013.01); *E04F 2203/06* (2013.01); *Y10T 403/47* (2015.01); *Y10T 403/52* (2015.01); *Y10T 403/7073* (2015.01)

(58) Field of Classification Search
CPC ... B62D 25/2054; B62D 29/02; B62D 33/046
See application file for complete search history.

(56) References Cited

U.S. PATENT DOCUMENTS

| | | | |
|---|---|---|---|
| 5,509,715 A * | 4/1996 | Scharpf | B62D 25/2054 105/422 |
| 5,928,735 A * | 7/1999 | Padmanabhan | B32B 21/08 428/33 |
| 5,938,274 A | 8/1999 | Ehrlich | |
| 6,021,615 A * | 2/2000 | Brown | E04F 15/022 428/167 |
| 6,179,942 B1 * | 1/2001 | Padmanabhan | 156/153 |
| H2104 H * | 5/2004 | Ramesh | B32B 5/18 428/304.4 |
| 6,922,965 B2 | 8/2005 | Rosenthal et al. | |
| 7,045,194 B2 | 5/2006 | Sneed | |
| 7,200,973 B2 * | 4/2007 | Tunis | B29C 70/088 114/143 |
| 8,191,328 B1 * | 6/2012 | Liu | E04F 15/04 52/390 |
| 2001/0035264 A1 * | 11/2001 | Padmanabhan | B32B 21/08 156/300 |
| 2006/0101754 A1 | 5/2006 | Risi | |
| 2007/0227090 A1 | 10/2007 | Plante | |
| 2008/0289277 A1 * | 11/2008 | Stone | 52/302.1 |
| 2009/0193747 A1 * | 8/2009 | Chorney | B62D 25/2054 52/583.1 |
| 2011/0146189 A1 * | 6/2011 | Courey | B32B 7/04 52/588.1 |
| 2013/0014464 A1 * | 1/2013 | Risi | B62D 25/2054 52/592.1 |

OTHER PUBLICATIONS

European Search Report dated Jul. 18, 2013 corresponding to European Patent Application No. 11737493.4; 6 pages.
Canadian Office Action dated Aug. 21, 2013 corresponding to Canadian Patent Application No. 2788047; 2 pages.
International Preliminary Report on Patentability from PCT Application No. PCT/US2011/22319 dated Feb. 22, 2012.

* cited by examiner

FLEXIBLE COMPOSITE LAP JOINT FOR TRAILER FLOORING

CROSS-REFERENCED APPLICATIONS

This application is a continuation application of U.S. patent application Ser. No. 13/012,899, filed on Jan. 25, 2011, which claims priority to U.S. Provisional Application, Ser. No. 61/336,914, filed on Jan. 28, 2010, which are incorporated herein by reference in their entireties.

BACKGROUND

1. Field of the Disclosure

The present disclosure generally relates to a fiber reinforced composite lap joint used in assembling floor boards to produce a load carrying floor for over the road vehicular trailers and truck bodies, shipping and domestic containers, and rail wagons and flat decks. More particularly, the present disclosure includes a lap joint that is formed by the composite underlayer of at least one composite floor board being extended at one lateral edge of the board to form a flange or ledge, which is then mated with an adjacent board at a recess to form a flexible lap joint between the boards.

2. Discussion of the Background Art

Composite wood floor boards for trailer flooring are composed of a top laminated wood layer and a bottom polymer composite layer. The top layer is made of many wood strips having random lengths, which are significantly less than the length of the board. The wood strips are edge-glued to make a unitary floor board with an approximate length up to 60 feet and width of 6 to 15 inches. The ends of the wood strips are fitted with a conventional end-joint in the form of a hook, butt, finger or other mechanical or adhesive joint to make a longitudinal connection with other strips at the front ends and back ends of the wood strips. A fiber reinforced polymer composite underlayer is at least partly bonded to the bottom side of the wood layer to reinforce the laminated wood and to provide a seal for the wood and end joints of the wood components in the boards.

A shiplap is a rectangular projecting lip running along the length at an edge of a floorboard. Typically, the lip extends along the width of a board by about ⅜ to ½ inch and has approximately half the thickness of the board. A "top shiplap" has the lip extending from the top half thickness of the board. Similarly, a "bottom shiplap" has the lip at the bottom half of the board. The crusher bead is a small semi-circular projection running along the length on each edge of a board and placed over or below a lip. When the floorboards are assembled side-by-side in a trailer such that the side edges of corresponding boards are squeezed together, the top and bottom shiplaps of adjacent boards overlap to form a seam of the shiplap joint. The shiplap joint between adjacent boards helps to transfer part of the bending and shear load applied on one board to its adjacent board. The shiplap joint also helps to prevent the entry of road debris and water or moisture into the trailer. The crusher bead provides spacing between adjacent boards to allow for lateral expansion of wood layer upon absorption of moisture by the wood. Putty is applied at the end-joints of wood strips of the boards to fill any resident gaps. In a typical vehicular trailer, container, truck body or rail wagon, henceforth generically referred to as a trailer, the floorboards are supported by thin-walled cross-members of I, C or hat sections, each having an upper flange, which span the width of the trailer and are regularly spaced along the length of the trailer. Each floor board is secured to the cross-members by screws extending through the thicknesses of the board and the upper flanges of the cross-members. The floor boards with the underlying supports and connections, together constitute the floor system. Ehrlich U.S. Pat. No. 4,703,948, is an example of prior art trailer floor assembly using shiplap joints of floor boards. The floor system of a van trailer and truck body is load rated according to Truck Trailer Manufacturers Association, Recommended Practice (TTMA RP) number 37-02, which is an industry standard in North America. In this test, a front axle loaded fork truck makes back and forth passes or load cycles on the floor in a trailer. In order to pass the test at a given load, the floor boards shall not be allowed to crack and fracture in a significant manner. In some cases, where the moisture sealing of the floor system is essential, the floor and the shiplap joints are required to maintain the initial seal after several thousand load cycles.

Even though the composite underlayer in the form of a flat sheet protects the wood and end joints at the bottom side of the wood layer, it does not protect the lateral sides of the boards in a conventional shiplap joint. Sometimes water from the roadside of the trailer can penetrate the shiplap joint either through the exposed lateral sides of end-joints in the wood layer or through any gaps between boards in the shiplap joint. Caulking or sealant is sometimes applied to the shiplap joint to form a better seal. The composite underlayer can be shaped in the form of conventional lips of the shiplap as shown in prior art U.S. Pat. No. 5,928,735. This protects the lateral wood sides of the boards, but it requires the forming of the composite shiplaps by the pultrusion process using a heated die. This process is relatively slow, costly and cumbersome to practice. In the case of a composite board with a bottom flat layer of composite, there is a need to improve the performance of the joint between adjacent boards.

A structural issue with conventional shiplaps is that the strength of the shiplap is less than the strength of the floorboard away from the shiplap. This is because the shiplap joint has two overlapping lips, namely the top and bottom lips and the top lip, which is unreinforced wood is relatively weak compared to the bottom lip with composite reinforcement. The top lip is susceptible to fatigue loads of lift truck load cycles that move cargo on the trailer floor. Further, the lips of conventional shiplaps are half the thickness of the boards and they transfer load from one lip to the other lip and thereby cause stress concentration in the inner corners of the lips. Reduction of stress concentration in the wood layer and strengthening of the joint is preferred for higher floor load rating and improved sealing at the joint.

As shown in FIGS. 1-4, conventional wood floor boards 1, 2 for over-the-road truck trailers and containers is normally manufactured with hardwoods such as ash, aspen, elm, yellow-poplar, and preferably oak, maple, birch, beech and the like, although softwoods such as Douglas fir, larch and spruce can be employed. Tropical wood species such as apitong, kapur, eucalyptus, and keruing are also used. Bamboo strips, which is typically not considered to be wood, but, which is a lignocellulosic material like wood can also be used in a generic woody floor for trailers. The generic wood floor shall be understood to be made of lignocellulosic material such as wood or bamboo. A conventional laminated wood floor board is composed of many wood strips 3, each with a length less than 10 feet. The wood strips are edge-glued to form a unitary board measuring 6 to 15 inches wide and less than 60 feet in length. The ends of the wood strips are fitted with an end-joint 4 in the form of a hook, butt, finger or other mechanical or adhesive joint to make a longitudinal connection with other strips at the front end and back end of the wood strips.

Figure 3:
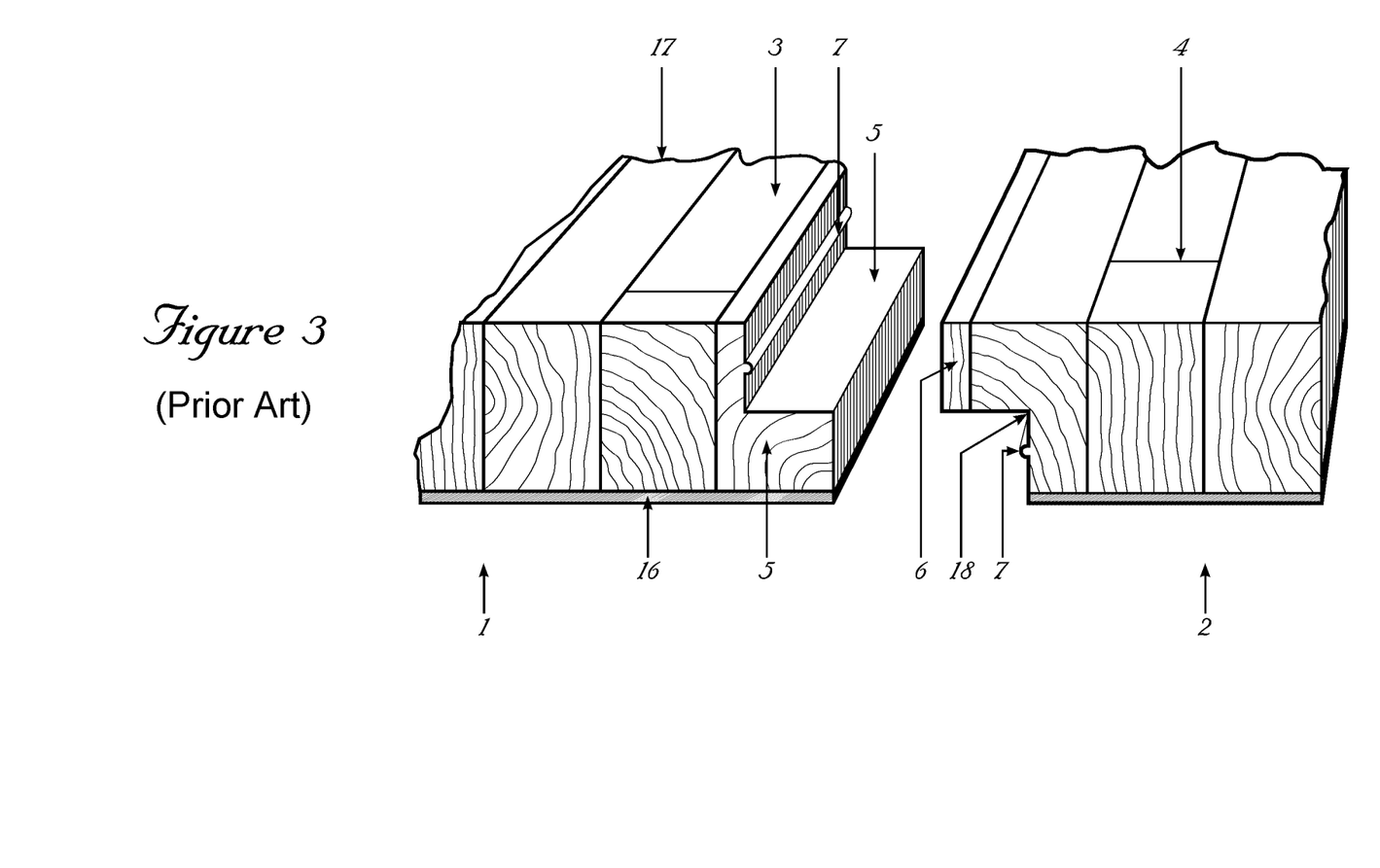
FIG. 3 shows the unassembled edges of two adjacent composite floor boards to form a conventional shiplap joint in a trailer floor.
Figure 4:
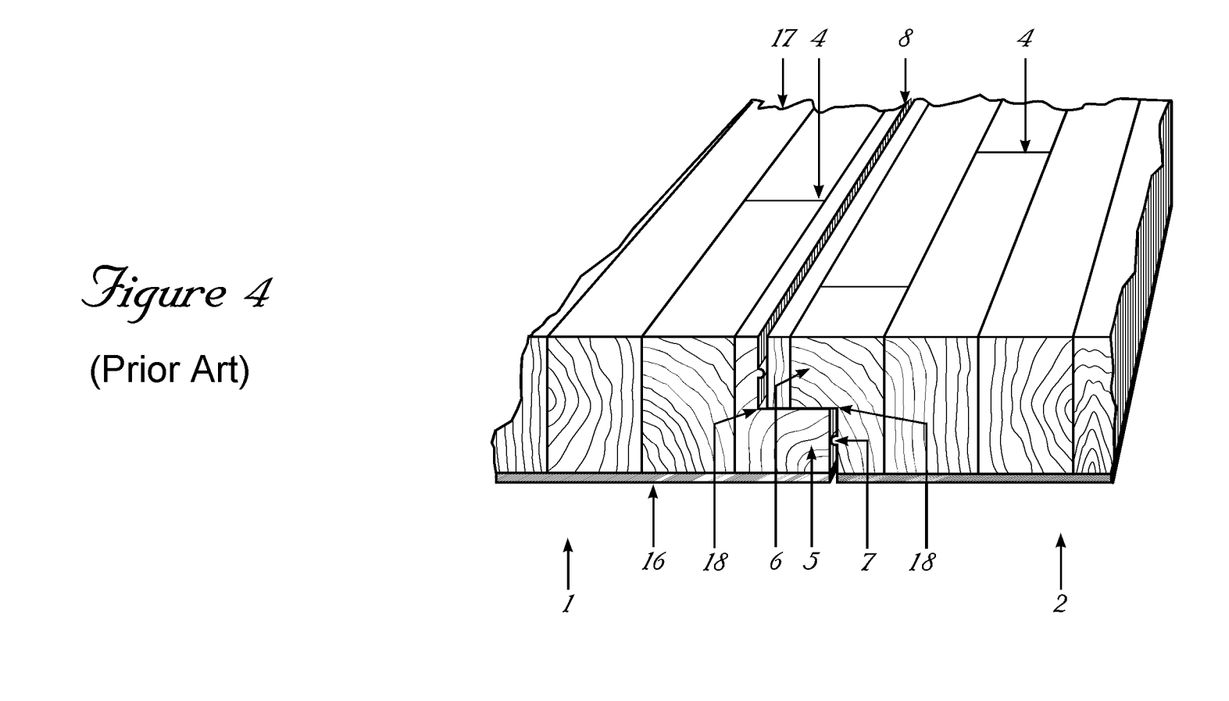
FIG. 4 shows the assembled edges of two adjacent composite floor boards to form a conventional shiplap joint in a trailer floor

In addition, shiplap 5, 6 is typically a rectangular projecting lip running along the length at an edge of a floorboard. Typically, the lip extends along the width of a board by about ⅜ to ½ inch and has approximately half the thickness of the board. A "top shiplap" 6 has the lip extending from the top half thickness of the board. Similarly, a "bottom shiplap" 5 has the lip at the bottom half of the board. The crusher bead 7 is a small semi-circular projection running along the length on each edge of a board and placed over or below a lip. When the floorboards are assembled side-by-side in a trailer such that the side edges of corresponding boards are squeezed together, the top and bottom shiplaps of adjacent boards overlap to form a seam 8 of the shiplap joint. The shiplap joint between adjacent boards helps to transfer part of the applied load from one board to the adjacent board. The shiplap joint also helps to prevent the entry of road debris and water into the trailer, but it is not waterproof. The crusher beads provide spacing between adjacent boards for lateral expansion of wood upon the absorption of moisture. A putty is applied at the end-joints of wood strips of the boards to fill any resident gaps. All the boards are supported by thin-walled cross-members 9 of I, C or hat sections, each having an upper flange, which span the width of the trailer and are spaced apart along the length of the trailer. The ends of the cross-members are attached to the side rails 10 of the trailer. A floor seal 11 may be used between a side rail and an adjacent floor board. Each floor board is secured to the cross-members by screws 12 extending through the thicknesses of the board and the upper flanges of the cross-members.

Figure 1:
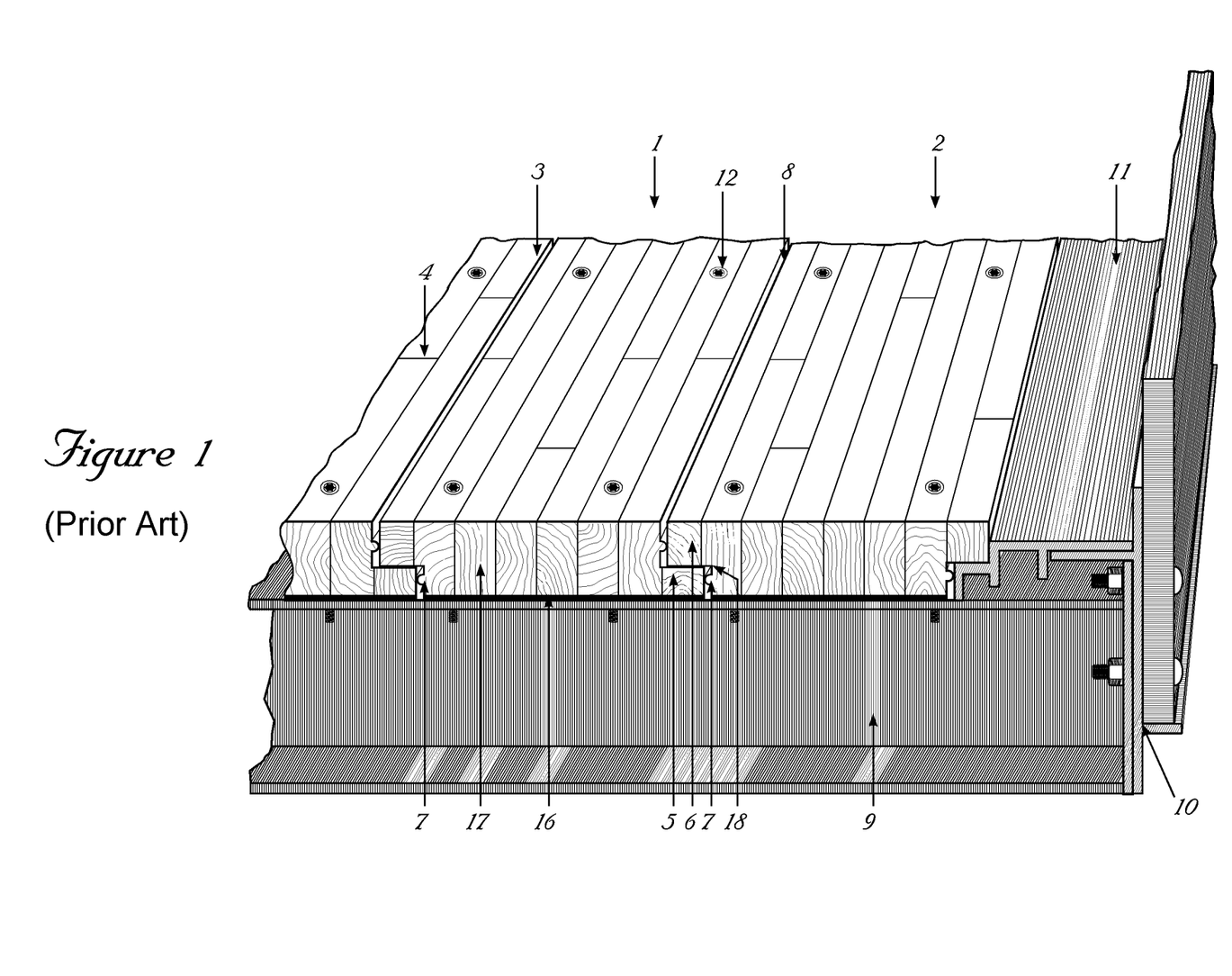
FIG. 1 is a schematic diagram of the prior art assembly of composite floorboards with shiplap joint in a trailer.
Figure 2:
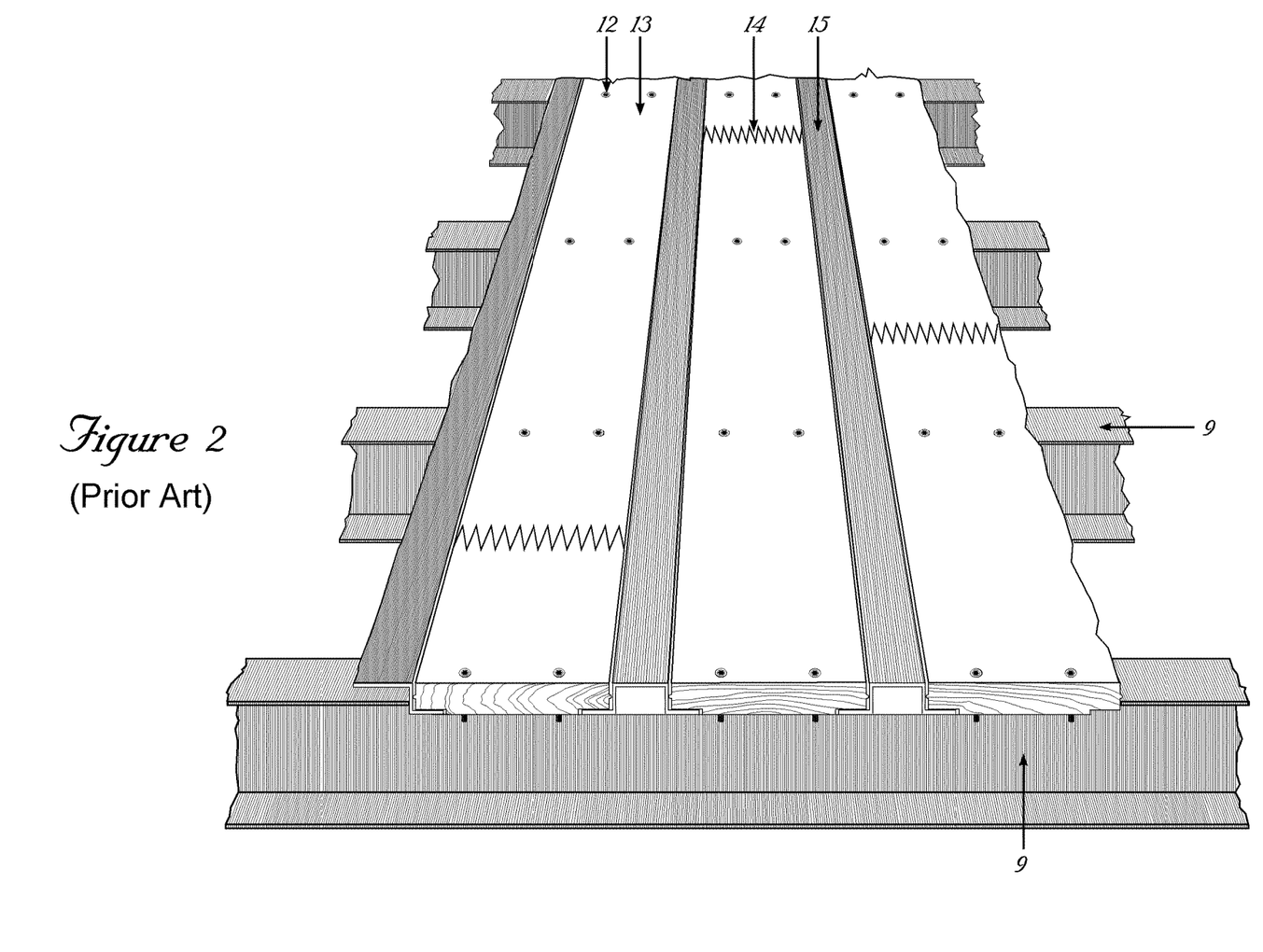
FIG. 2 is a schematic diagram of the prior art assembly of finger jointed solid wood or bamboo floorboards using omega channels between adjacent boards in a trailer.

In some closed van trailers that are more common in Europe and in some open flatbed trailers and also in open rail decks, solid wood boards 13 are used for flooring. The boards may be finger jointed 14 end-to-end to provide a long length. In some closed van trailers, a heavy duty steel or aluminum hat-channel 15, also called as omega channel, is used between boards. The channel reinforces the joint between adjacent boards, especially around a finger joint of the boards.

In a composite floor configured for a van trailer (FIG. 1), a composite underlayer 16 is bonded to the bottom side of the wood layer 17 of each board to reinforce the wood and to provide a seal for the wood and end joints of the wood components in the laminated boards. The composite is typically a polymer composite including a polymer matrix such as epoxy, polyester, phenolic, PP or PET and includes one or more of reinforcing fibers such as glass, aramid, polyethylene, or carbon fibers. The composite layer 16 is adhesively bonded to the bottom side of the laminated wood layer 17.

Figure 5:
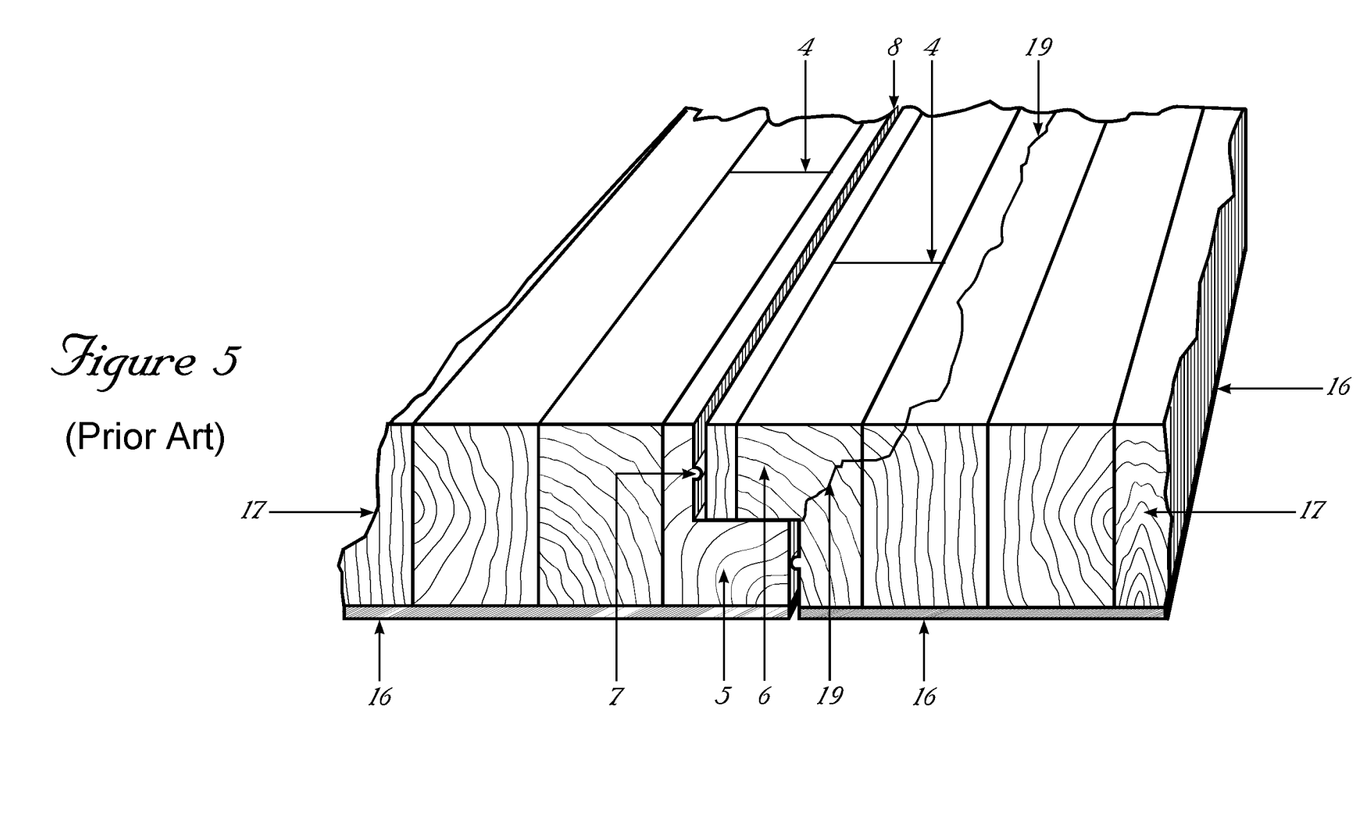
FIG. 5 shows the conventional shiplap joint assembly of two adjacent composite floor boards with a cracked lip of a top shiplap.

A structural problem with conventional shiplaps is that the strength of the shiplap is much less than the strength of the floorboard away from the shiplap. This is because the shiplap joint has two overlapping lips 5, 6 and the top lip 6, which is unreinforced wood is relatively weak compared to the bottom lip 5 with composite reinforcement. The top lip is susceptible to the fatigue loads of lift trucks that move cargo on the trailer floor. Since the lips of shiplaps are half the thickness of the boards and they transfer load from one lip to the other lip, the load transfer causes stress concentration in the inner corners 18 of the lips upon loading of the flooring with lift trucks. The back and forth movement of the lift truck on the floor during loading and unloading of cargo can lead to cracking 19 of the top shiplap (see FIG. 5), which is not reinforced. Sometimes the bottom lip can crack at the inner corner as well. Composite floors are normally made thinner than conventional laminated wood floors for similar structural performance in a trailer, however the limitation of the thinner composite floor board is the weakness of the even more thinner shiplaps.

The present disclosure provides a composite lip at one edge of a board, which can be mated with the recess at the bottom side of an adjacent board. The composite lip is fabricated with the flat sheet composite that is also used as the underlayer of the prior art composite board. The wood layers of two adjacent boards are not lap jointed as in conventional shiplap joint. This allows for the relative deflection of one board with respect to the adjacent board without significant load transfer and improves flexibility of the joint, which in turn prevents cracking of the wood layer at the corners of the lap joint. Further, the elimination of shiplaps, allows for about 4% reduction in the wood used to make a typical 12 inch wide floor board, thus saving material and cost. The material savings is applicable to all vehicular floors, including closed van and flatbed trailers, truck bodies, containers, rail decks and wagons. By retaining the full thickness of wood at the edges of boards, the strength of the joint is superior to conventional shiplap joint. The composite lap joint provides a means to eliminate the heavy duty omega channels that are used in some floor systems. Surprisingly, the seal of the composite joint has been found to be leak free in a smoke test after conducting industry approved dynamic cyclic load test in a van trailer. That is, the use of a composite flange according to the present disclosure allows for the improved sealing of the joint and prevents water ingress into the trailer from the roadside, is stronger than a conventional shiplap joint, and saves some of the material required to make a floor board compared to conventional floor board with conventional shiplap design configuration.

SUMMARY OF THE DISCLOSURE

A composite lap joint for the assembly of a first and a second floor board from a plurality of boards, used to make the floor for a vehicular trailer, each board composed of a layer of wood at the top side and a layer of fiber reinforced composite at the bottom side, wherein the composite layer is at least partly bonded to the wood layer; the composite layer of a first board forming a lip, wherein the lip is a lateral extension of the composite layer and the lip is disposed under the bottom side recess of an adjacent second board to form a composite joint, whereby the joint provides improved flexibility, moisture sealing ability at the seam of the joint and higher strength to the edges of the boards.

Preferably, the composite layer of the second board is offset from an edge of the board to provide a recess for disposing the composite lip of the first board.

Alternatively, the composite layer of the second board is contoured around a recess at an edge of the wood layer to provide a space for disposing the composite lip of the first board.

In one embodiment, the composite lap joint is provided such that a substantial part of the composite layer away from an edge of a board is bonded to the wood layer with a first adhesive having a lower flexibility and a part of the composite layer at the edge of the board near the lip, is bonded with an adhesive or sealant with higher flexibility and capable of substantial elongation or stretching under load, thus allowing the composite lip to flex and reduce load transfer between boards.

In another embodiment, a compressible seal, such as a closed celled foam tape or an extruded sealant or an elastomer, is provided between the composite lip of a first board and the bottom side of a second board to allow for improved sealing of the joint.

A joint for providing improved structural performance and moisture barrier between a first and second board in a vehicular trailer floor, the trailer configured in the form of a box or flat deck structure for transport of goods on the roads or the rails, each of the boards having a lignocellulosic or wood top layer and a fiber reinforced composite bottom layer adhesively bonded to the underside of the top layer, the boards extending along the length of the trailer and fastened to supporting sub-structure of the vehicle, the sub-structure consisting of spaced apart cross-members, the cross-members extending along the width of the vehicle; the joint formed by laterally extending the composite layer of the first board at an edge of the board to render a lip below the top layer, providing a recess at the bottom side of a second board along an edge and disposing the lip of the first board into the recess of the second board.

According to the present disclosure, the composite underlayer of a composite board is extended by up to about 2 inches at an edge of the floor board. The extension of the composite layer is mated with the bottom side of an adjacent floor board to form a composite lap joint. The thickness of the top layer at the edges of a board at a composite lap joint is higher than half the thickness of the board. The composite lap joint is therefore stronger than a conventional shiplap joint and it also provides better sealing against water intrusion through the joint from the underside of the floor due to the ability of the composite lip to flex under load and not fracture.

In a preferred embodiment, the extension of the composite lip is approximately ¼ to ¾ inch. In a more preferred embodiment, the extension of the composite lip is ⅜ inch to ½ inch, both dimensions inclusive. Additionally, crusher beads may be provided at the lateral vertical sides of the top layer of the mating adjacent boards.

Alternatively, the lateral side edge of the wood layer of one board is skewed at an angle relative to the lateral side edge of adjacent board and the crusher bead is eliminated. The V-shaped grove thus formed at the lap joint allows for expansion of boards at the top sides upon absorption of moisture.

In another embodiment, a caulking or sealant is applied to the composite lip before assembly with an adjacent board.

A composite wood floor board assembled adjacent to another composite wood floor board, each the board comprising: a top layer of laminated hardwood comprising: a top side; a bottom side; a first lateral side; and a second lateral side opposite the first lateral side, wherein at least one of the first and second lateral sides is formed without shiplap lips; and a bottom layer comprising a planar fiber-reinforced polymer composite that is bonded to the bottom side of the top layer of the laminated hardwood and reinforces the top layer, wherein the bottom layer of fiber-reinforced polymer composite extends laterally outwardly by a distance up to two inches (2") from the first lateral side of the top layer, and wherein a part of the bottom layer of the composite wood floor board is bonded to the top layer with a first adhesive and a part of the bottom layer is bonded with a second adhesive or sealant.

The bottom layer of fiber-reinforced polymer composite is laterally inset up to two inches (2") from the first lateral side of the top layer. The composite wood floor board forms part of a floor system for a vehicular trailer, container, truck body, rail wagon, or rail deck.

The laminated hardwood further comprises: a hardwood selected from the group consisting of oak, maple, birch, beech, and any combinations thereof, and wherein the planar fiber-reinforced polymer composite comprises: one or more fibers selected from the group consisting of glass fiber, carbon fiber, and aramid fiber; and a polymer selected from the group consisting of epoxy, polyester, polyurethane, and phenol.

Further objects, features and advantages of the present disclosure will be understood by reference to the following diagrams and detailed description.

DETAILED DESCRIPTION OF THE PREFERRED EMBODIMENT

Figure 6:
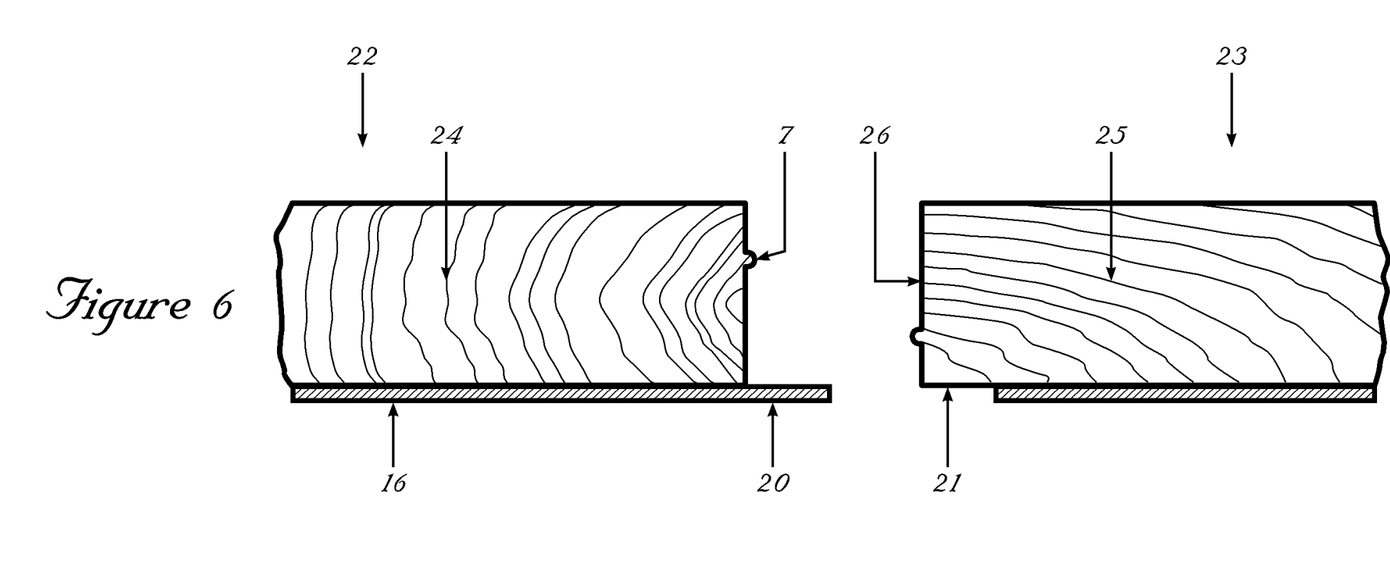
FIG. 6 shows the unassembled edges of two composite boards to form a composite lap joint, wherein one edge has a composite lip and the other edge has an offset composite layer to form a recess at the bottom side according to one embodiment of the present disclosure.
Figure 7:
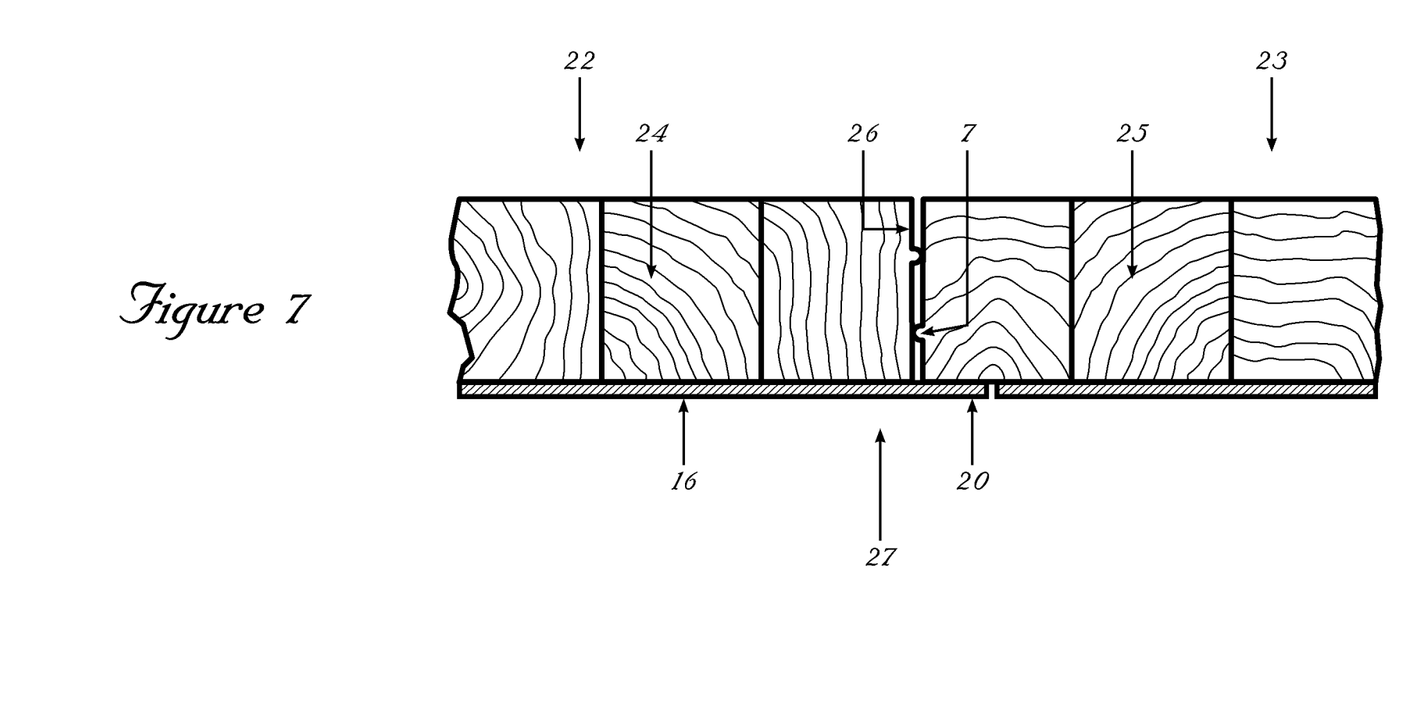
FIG. 7 shows the composite lap joint assembly of FIG. 6 with two adjacent composite boards with crusher bead on lateral side edges of boards.

Various embodiments of the this disclosure are shown in FIGS. 6-11, attached hereto, wherein FIGS. 6 and 7 show a composite lip 20 at one edge of a board 22, which can be mated with bottom side edge 21 of an adjacent board 23.

Composite lip 20 is fabricated with a planar layer of composite material that is also the underlayer 16 of composite board 22. Top layers 24 and 25 of the two adjacent boards have thicker edges 26 compared to the conventional shiplaps, which have half the thickness of the board. This makes the edges of boards stronger and resistant to fatigue loading. The composite layer 16 is a fiber reinforced polymer, wherein the polymer is a thermoset or a thermoplastic. Examples of thermoset polymers can be epoxy, phenolic, polyester, vinyl ester, polyurethane, etc. The fiber reinforcement can be one or more types of fibers, such as glass, carbon, graphite, aramid, polyethylene, etc. Additionally, the composite layer 16 may have high strength steel wires as reinforcement. Preferably, the composite layer is configured to provide strength and stiffness along the both major axes of the layer. In one embodiment, a portion of the fibers, up to 50% of the total fibers by weight are oriented approximately along the transverse axis or width of the board and the remaining fibers are oriented approximately along the longitudinal axis or length of the board. In another embodiment, the composite reinforcement is designed to obtain a transverse tensile strength of the composite layer that is less than its longitudinal tensile strength. The composite layer 16 may be bonded to the top layer 24 using any suitable adhesive such as epoxy, polyurethane, hotmelt, acrylic, cyanoacrylate, etc., which may be a thermoset or a thermoplastic polymer.

According to the present disclosure, composite underlayer 16 of composite board 22 is extended by up to 2 inches at an edge of the floor board. The extension of the composite layer is mated with the bottom side of an adjacent second floor board 23 to form a composite lap joint 27. The thickness of the wood or lignocellulosic top layer 24 and 25 at the edges of boards at a composite lap joint is higher than half the thickness of the board. The top layers 24 and 25 may be nearly equal to the thickness of boards, when the composite layer 16 is relatively very thin. The composite lap joint is therefore stronger than a conventional shiplap joint and it also provides better sealing against water intrusion through the joint from the underside of the floor. This composite lap joint 27 allows for the relative deflection of one board with respect to the adjacent board without significant load transfer between the boards, which in turn prevents cracking of the wood layer that can happen in conventional shiplap joint. In order to fabricate a shiplap, an additional 7/16 inch wide piece of material is required in the top layer. In the composite lap joint, the additional material of the top layer is saved. The composite layer is offset from one edge to the other edge of board with no gain or loss of material compared to conventional board with shiplap. This provides a net saving of material in the top layer to make a board with composite lap compared to conventional shiplap.

In one embodiment, the extension of the composite lip 20 is approximately ¼ to ¾ inch. In a more preferred embodiment, the extension of the composite lip 20 is ⅜ inch to ½ inch, both dimensions inclusive. In another embodiment, a crusher bead 7 is included at a lateral vertical edge 26 of the top wood layer of at least one of the two adjacent boards.

Figure 8:
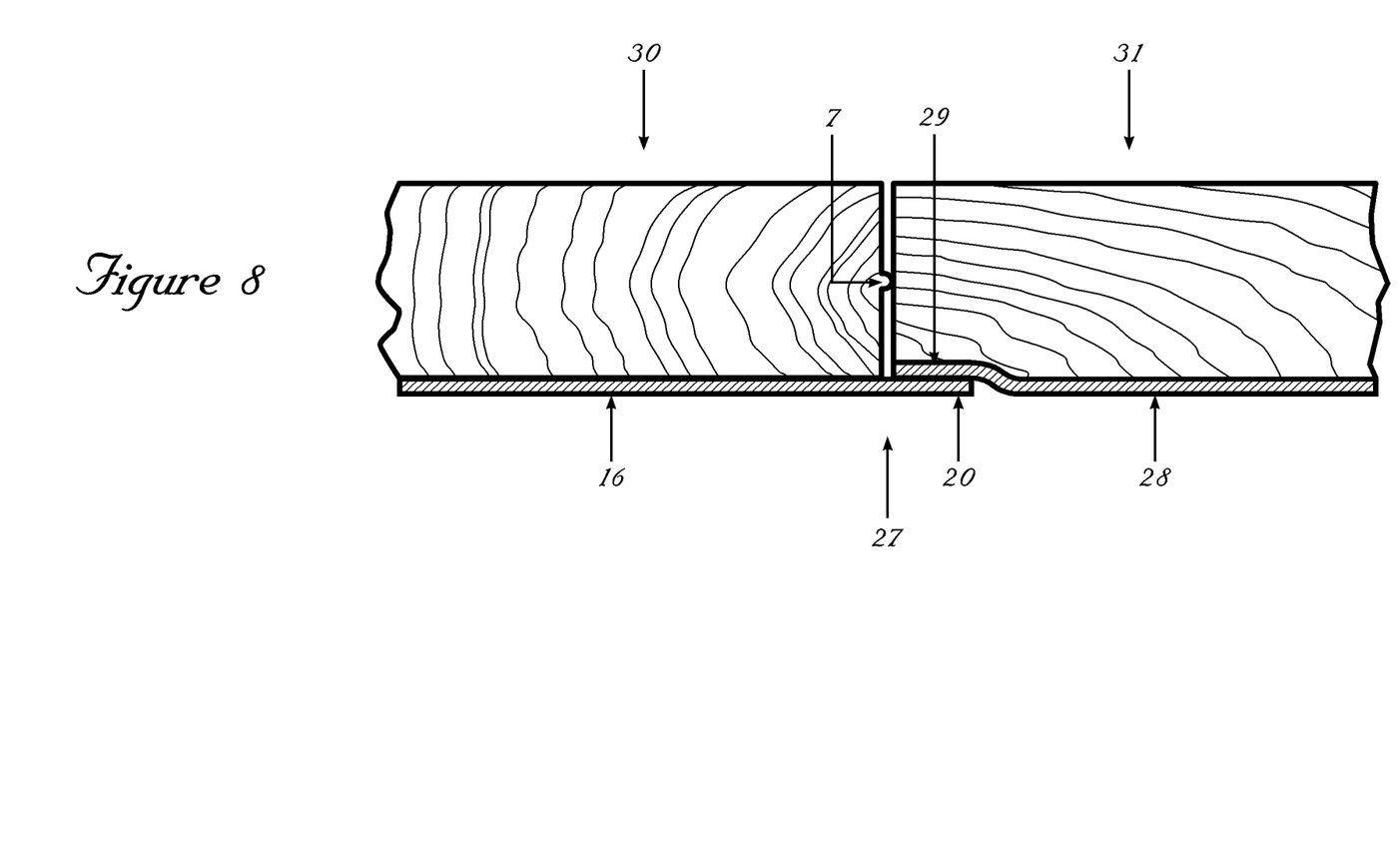
FIG. 8 shows the composite lap joint assembly of two adjacent composite boards, wherein one edge has a flat composite lip and the other edge has a bottom recess covered by a contoured composite underlayer according to another embodiment of the present disclosure.

In another embodiment as shown in FIG. 8, composite underlayer 16 of first board 30 having a crusher bead 7 is extended to form a lip 20 as before. Composite underlayer 28 of the second adjacent board 31 is contoured around a shallow bottom cut profile or rout 29 in the wood layer at the edge of second board 31, thereby providing a recess below the edge of second board 31 for insertion of composite lip 20 of the first board 30.

Figure 9:
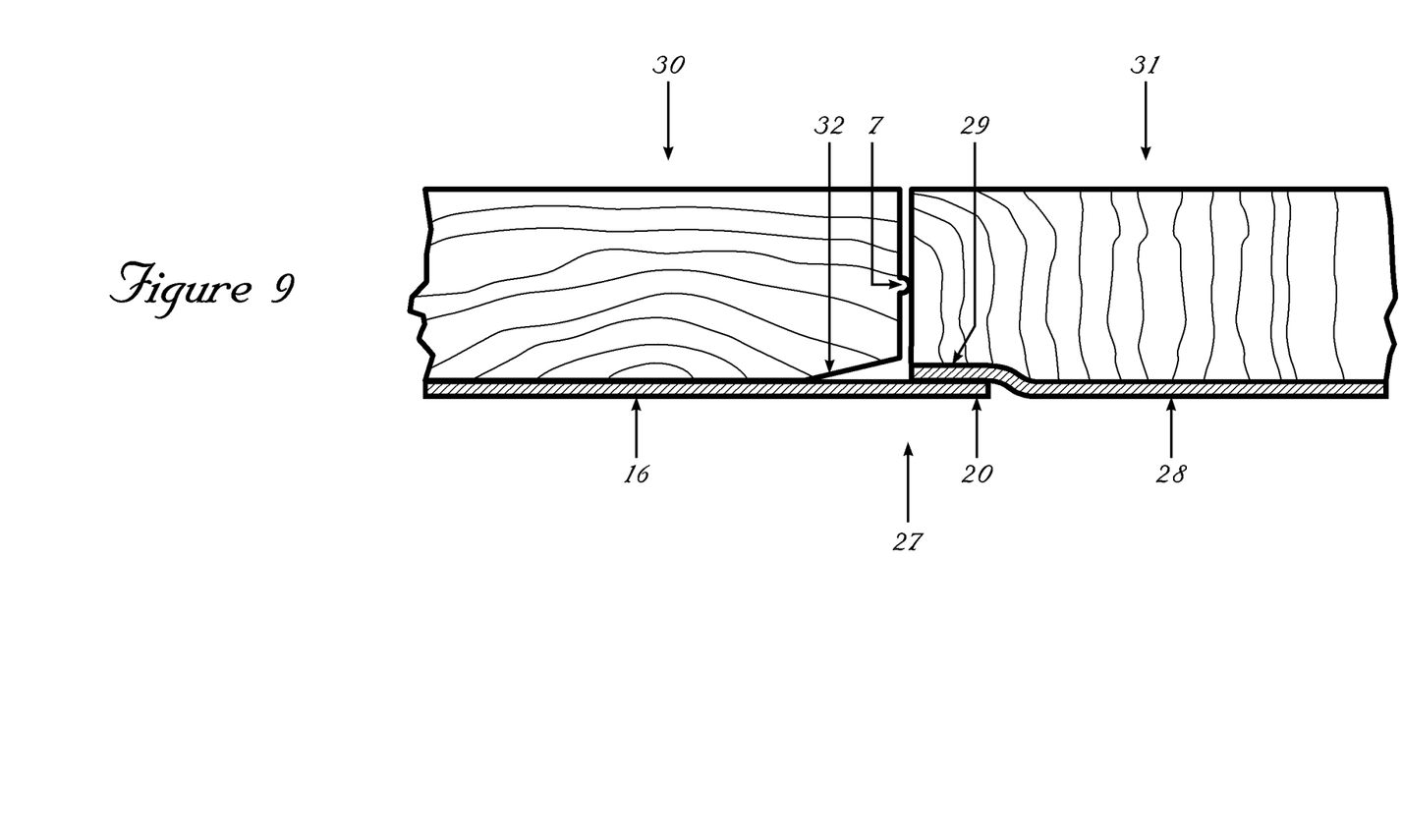
FIG. 9 shows the composite lap joint assembly of two adjacent composite boards, wherein the composite lip is partly non-bonded to the bottom edge surface of one board according to yet another embodiment of the present disclosure.

In FIG. 9, composite underlayer 16 adjacent to composite lip 20 of a board is partly non-bonded to the bottom edge surface 32 of the wood layer of first board 30. This allows for increased flexibility of the composite lip 20 when pushed down by the deflection under load of the adjacent board 31.

Figure 10:
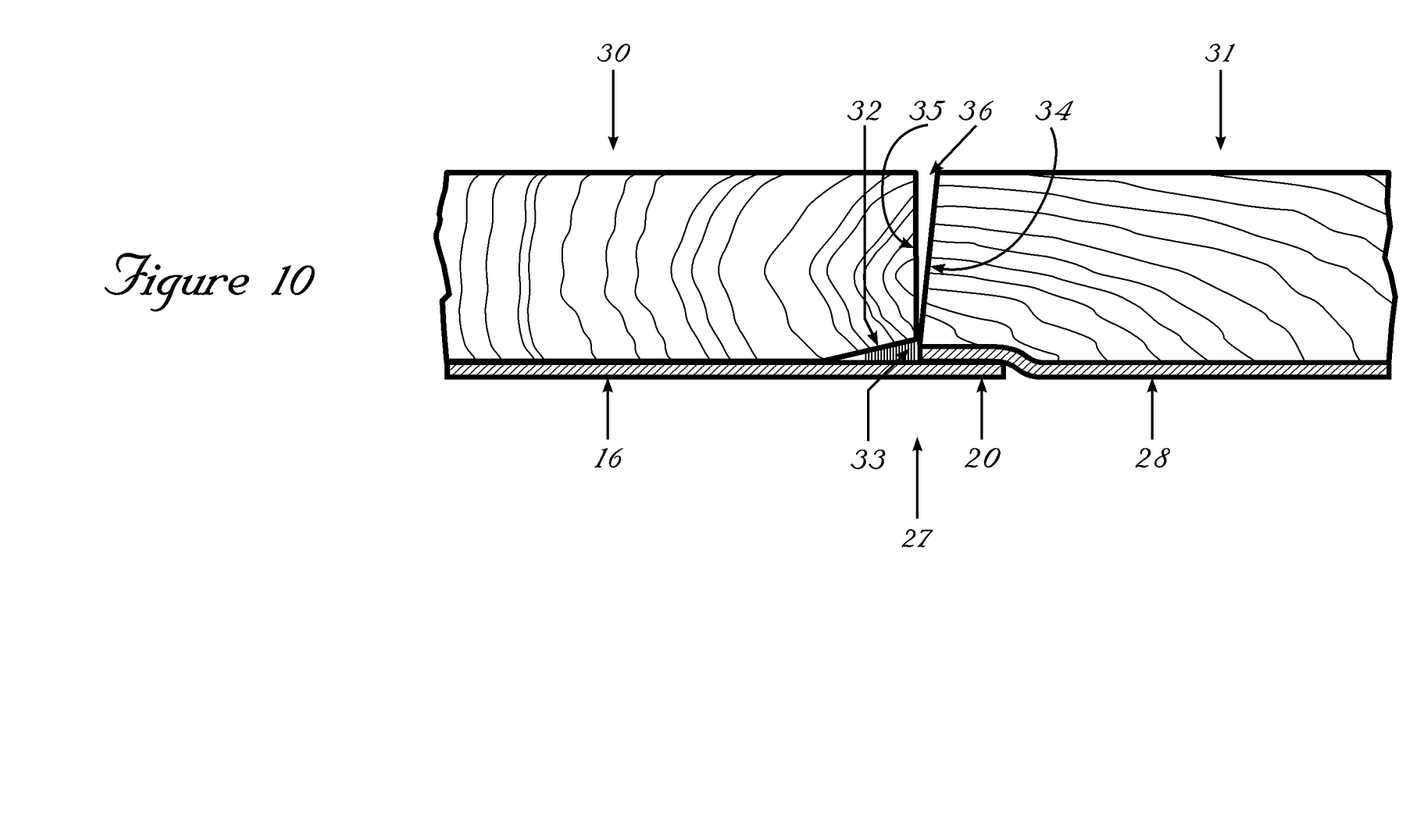
FIG. 10 shows the composite lap joint assembly of two adjacent composite boards, wherein the composite lip is bonded to the bottom edge surface of one board with an adhesive or sealant material capable of elastic stretching to increase flexibility of the lap according to still yet another embodiment of the present disclosure.

In FIG. 10, an adhesive caulk or sealant or an elastomer 33 with high flexibility and elongation or stretch to failure of 100% or more is used at the bottom edge surface 32 of the first board 30 to allow for increased flexibility of composite lip 20 and improved sealing of the joint. Typical caulking and sealant suitable for this application are based on butyl rubber and polyurethane. Moisture curing polyurethane sealant is commercially available under the trade name Sikaflex from Sika Corporation. The sealant may be applied to the joint at the time of installation of boards in a trailer.

Another embodiment also shown in FIG. 10 depicts lateral side edge 34 of the top layer on second adjacent board 31 and side 34 is angled in relation to the lateral side edge 35 of first board 30 and the crusher bead has been eliminated. The V-shaped grove 36 thus formed at the lap joint 27 allows for the expansion of wood top layer of boards 30 and 31 upon absorption of moisture.

Figure 11:
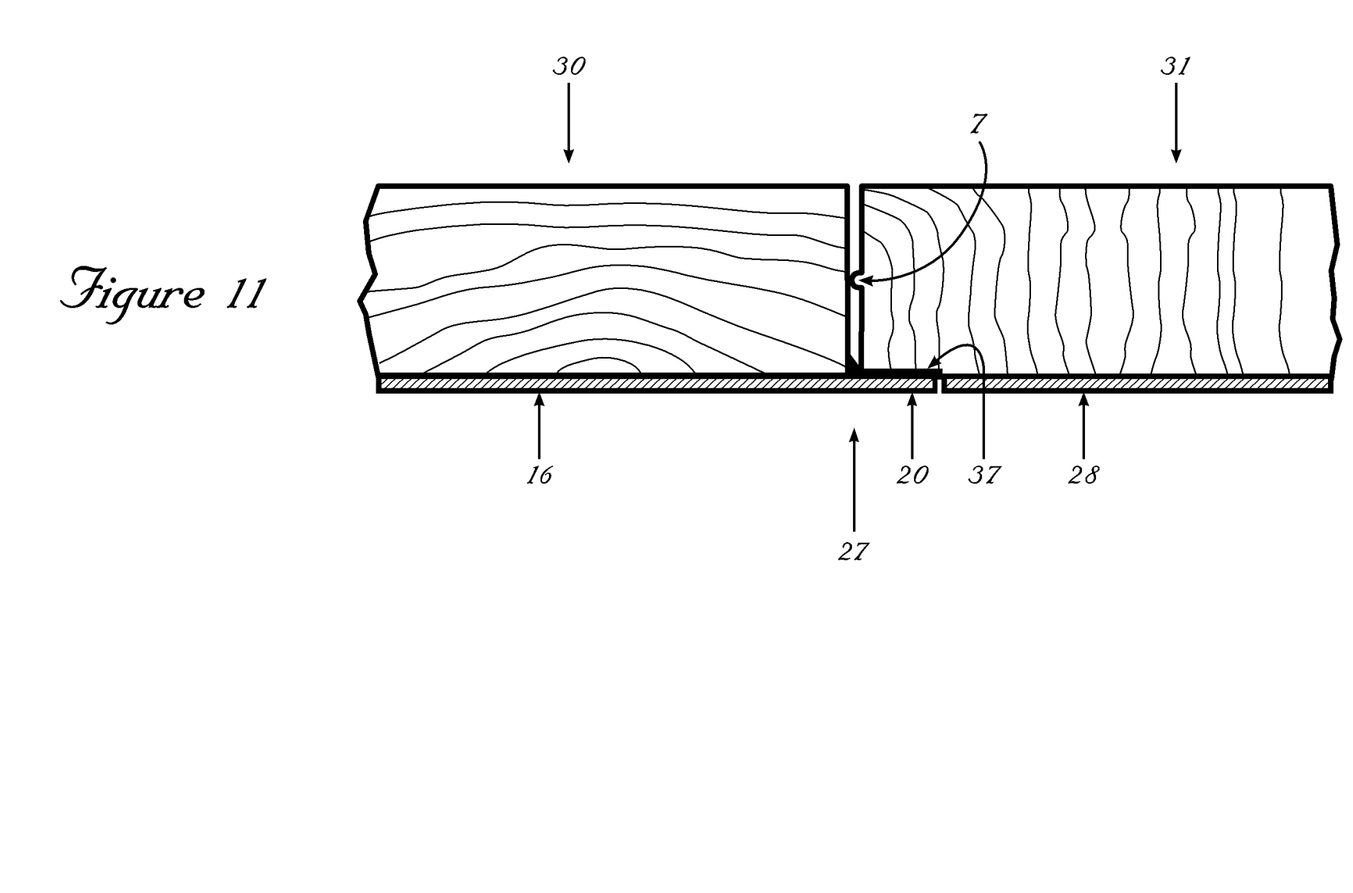
FIG. 11 shows the composite lap joint assembly of two adjacent composite boards, wherein the composite lip is coated with a caulk or seal tape or adhesive before assembly with the edge of an adjacent board according to another embodiment of the present disclosure.

In FIG. 11, a compressible material in the form of a foam tape or a sealant 37 is applied on the composite lip 20 for moisture sealing.

A one inch thick composite floor was fabricated for testing the performance of the composite lap joint of the present disclosure as shown in FIG. 7. The floor was composed of eight boards and there were seven composite lap joints between adjacent boards. A butyl rubber caulk was applied on the composite lip during installation of boards in a van trailer. The floor was supported by 4 inch high cross-members, made of steel with minimum yield strength of 80 Ksi, which is a North American industry standard for common van trailers. The cross-members were spaced at 12 inches in the bay section of the trailer. The composite lip 20 was 0.5 inch wide and 0.05 inch thick. The composite was made of continuous glass fiber rovings and epoxy resin. About 90% by weight of the glass fiber was approximately oriented in the longitudinal direction of each board and the remaining fibers were laid generally across the width of each board. The top layer of the boards was laminated oak. A polyurethane hotmelt adhesive supplied by Forbo Adhesives LLC was used for bonding the composite layer to the boards.

The one inch composite floor is desirable for light weight trailers, especially those that are designed for hauling higher density beverage and canned products. It saves over 300 pounds of weight in a typical 53 foot dry van trailer compared to the industry standard 1.31 inch thick laminated oak floor. These trailers require a TTMA floor load rating of 16,000 pounds to support the lift truck that moves pallets of beverage. The conventional one inch thick composite floor with shiplap joint between boards is not suitable for this type of application due to the stress concentration at the corners of the 0.5 inch thick shiplaps and due to the high number of load cycles encountered in typical beverage hauling applications.

The cyclical load test of the floor system was conducted according to TTMA RP 37-02. A forklift truck with a front axle load of 16,000 pounds was cycled 3000 times along the center axis of the one inch composite floor having the composite lap joint in a van trailer. An additional 3000 load cycles were applied at the front axle load of 17,500 pounds on the same floor. After 6000 load cycles on the floor boards, there was no observable damage to the floor boards on both the top and bottom sides and at the composite lap joint. After the final completion of the testing, the loaded floor boards were removed and closely observed for signs of cracks. The composite lips of the boards were intact without any fracture of the transverse glass fibers of the composite layer. Surprisingly, the epoxy resin of the composite was crazed at the corner of the wood layer and the composite lip. It appeared that the crazing of epoxy may have increased the flexibility of the composite lip, which in turn helped to avoid gross fracture of the lip and debonding of the composite lip from the wood layer. The caulk effectively bonded adjacent boards at the lap joints and maintained a good seal. After the completion of the load test, a smoke bomb was placed inside the trailer and the doors were shut to test for leaks. If smoke leaks through the floor, it is generally considered to be a sign of potential pathways for water and moisture to migrate to the top side of the floor from the road side of the trailer. Unexpectedly, the composite lap joints were found to be free of leaks. This test proved the improved structural and sealing performance of the composite lap joint of the present disclosure. This test showed that the floor system was capable of handling loads higher than 16,000 lbs and even higher than 17,500 pounds for thousands of load cycles without compromising the integrity of the composite lap joint.

While the composite lap joint has been proven to be particularly useful for 1 inch thick floors, it is a better joint for all suitable thicknesses of boards ranging from 0.75 to 1.5 inch. The elimination of conventional shiplaps saves about 7/16 inch of wood material of the top layer, which reduces the cost of making a composite floor board at a given width. The increased strength of the joint allows for the elimination of omega channels that are used in some wood floors, thus saving additional weight and cost, while simplifying the floor design. As such, the composite lap joint is useful in floor systems in a variety of vehicles, including over the road trailer, truck body, rail decks and wagons. The top layer of the boards can be laminated wood, bamboo, solid wood or other lignocellulosic substrates.

While I have shown and described several embodiments in accordance with my disclosure, it is to be clearly understood that the same may be susceptible to numerous changes apparent to one skilled in the art. Therefore, I do not wish to be limited to the details shown and described but intend to show all changes and modifications that come within the scope of the appended claims.

What is claimed is:

1. At least a first composite wood floor board assembled adjacent to at least a second composite wood floor board, each said board comprising:
   a first length up to about 60 feet; and
   a top layer of laminated hardwood comprising:
      a top side;
      a bottom side;
      a second length approximating the first length;
      a width;
      a thickness;
      a first lateral side; and
      a second lateral side opposite the first lateral side,
      wherein at least one of the first and second lateral sides of the layer of laminated hardwood is formed without a hardwood shiplap lip, wherein the shiplap lip is a rectangular projecting lip having a length approximating the second length of the laminated hardwood, width, thickness approximating half of the thickness of the laminated hardwood, and volume of hardwood used for making a shiplap joint between two adjacent composite wood floor boards; and
   the top layer of laminated hardwood further comprising a plurality of wood strips, each of the plurality of wood strips having a length and width less than the length and width of the top layer, respectively, wherein the plurality of wood strips are arranged in side-by-side rows and glued together to form the top layer of laminated hardwood; and
   each of the plurality of wood strips comprise a front end and a back end, wherein the front and back ends of each of the plurality of wood strips are fitted with an end-joint to form a connection between ends of adjacent wood strips of the plurality of wood strips arranged in a row;
   a bottom layer comprising a planar fiber-reinforced polymer composite that is bonded to the bottom side of the top layer of the laminated hardwood and reinforces the top layer,
   wherein the bottom layer of fiber-reinforced polymer composite of the at least first composite wood floor board extends laterally outwardly by a distance up to two inches (2") from a lateral side of the top layer to form a composite lip,
   wherein the second composite wood floor board has a bottom side recess at an opposing lateral side for mating with the composite lip of the at least first composite wood floor board,
   wherein the composite lip of the at least first composite wood floor board is disposed under the bottom side recess of the at least second composite wood floor board to form a seam,
   wherein a part of the bottom layer away from the composite lip of the at least first composite floor board is bonded to the top layer with a first adhesive, and a part of the bottom layer at an opposing lateral side close to the composite lip of the at least first composite wood floor board is bonded with a second adhesive or sealant, to the second composite wood floor board to form a composite lap joint between the first and second composite wood floor boards,
   whereby the composite lap joint connects the first and second composite wood floor boards and provides savings in the volume of hardwood used in a shiplap lip having a width of about quarter inch (¼") and up to about two inches (2").

2. The at least first composite wood floor board assembled adjacent to the at least second composite wood floor board according to claim 1, wherein the bottom layer of fiber-reinforced polymer composite is laterally inset up to two inches (2") from a lateral side of the top layer.

3. The at least first composite wood floor board assembled adjacent to the at least second composite wood floor board according to claim 1, wherein the first and second composite wood floor boards form part of a floor system for a vehicular trailer, container, truck body, rail wagon, or rail deck.

4. The at least first composite wood floor board assembled adjacent to the at least second composite wood floor board according to claim 1, wherein the top layer of laminated hardwood further comprises:
   one or more hardwood selected from the group consisting of oak, maple, birch, beech, and poplar, and
   wherein the planar fiber-reinforced polymer composite comprises:
   one or more fibers selected from the group consisting of glass fiber, carbon fiber, and aramid fiber; and
   a polymer selected from the group consisting of epoxy, polyester, polyurethane, phenolic, polypropylene, and polyethylene terephthalate.

5. The at least first composite wood floor board assembled adjacent to the at least second composite wood floor board according to claim 1, wherein at least one of opposing lateral side edges of one or both of the at least first and second composite wood floor boards further comprises one or more crusher beads.

6. A wood floor having a load rating of at least 16,000 lbs for truck trailers and containers, said wood floor comprising:
at least a first composite floor board disposed adjacent to at least a second composite floor board and the floor boards supported by cross-members, the at least first and second composite floor boards each having a top side and a bottom side, wherein each of the at least first and second composite floor boards comprises:
a first length up to about 60 feet;
a layer of wood at the top side that has opposing lateral side edges, wherein each of the opposing lateral side edges is more than half the thickness of the first composite floor board and the second composite floor board and does not form a lip of a shiplap, wherein the lip of the shiplap is a rectangular projecting lip of the layer of wood, having a length approximating the first length, width, thickness approximating half the thickness of the first composite floor board, and volume of wood, and wherein the layers of wood of the at least first composite floor board and the at least second composite floor board are not joined by lips of a shiplap joint; and
a composite layer formed from a layer of non-wood fiber reinforced polymer composite at the bottom side, and wherein the composite layer is at least partly bonded to the layer of wood and reinforces the layer of wood; and
a composite lip formed by the composite layer at one of the opposing lateral side edges of the layer of wood of the at least first composite floor board, wherein the composite lip is a lateral extension of the composite layer of the at least first composite floor board; and
a bottom side recess at one of the opposing lateral side edges of the layer of wood of the at least second composite floor board, for mating with the composite lip of the at least first composite floor board,
wherein the composite lip is disposed under the bottom side recess of the at least second composite floor board to form a composite lap joint and a seam,
wherein a part of the composite layer away from the composite lip of the at least first composite floor board is bonded to the layer of wood with an adhesive,
whereby the composite lap joint connects the first and second composite floor boards and provides savings in the volume of wood used to form a lip of shiplap having width of about quarter inch (¼") or more of a shiplap joint of adjacent wood floor boards.

7. The wood floor according to claim 6, wherein the layer of wood comprises a hardwood, and the composite layer comprises a thermoset or thermoplastic polymer and fibers selected from the group consisting of glass fibers, carbon fibers, graphite fibers, aramid fibers, and polyethylene fibers.

8. The wood floor according to claim 6, further comprising a caulk or sealant or a sealing tape applied at the composite lap joint between the first and second composite floor boards.

9. The wood floor according to claim 6, wherein at least one of opposing lateral side edges of one or both of the at least first and second composite wood floor boards further comprises one or more crusher beads.

\* \* \* \* \*